Feb. 16, 1960   J. J. DAVIS   2,925,157
ANTI-REVERSING ROTARY COUPLING
Filed Aug. 12, 1957
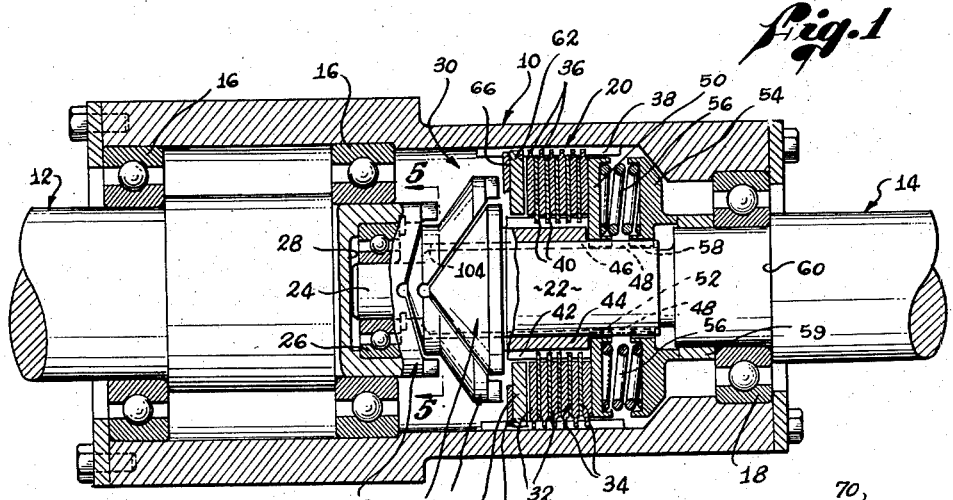
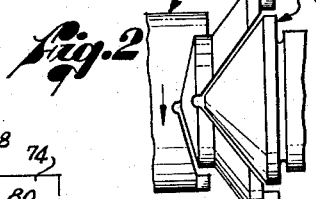
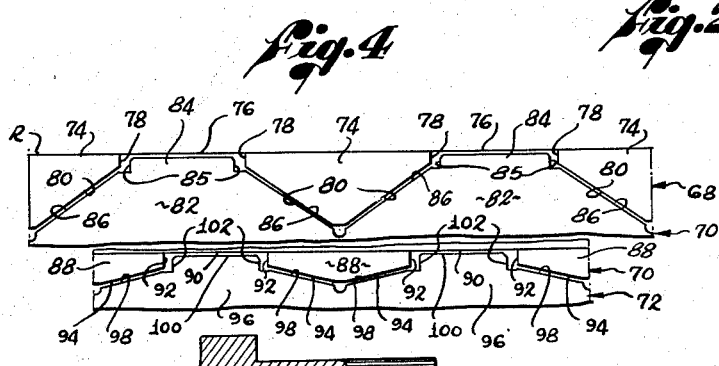
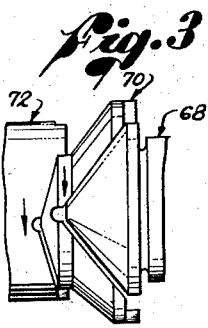
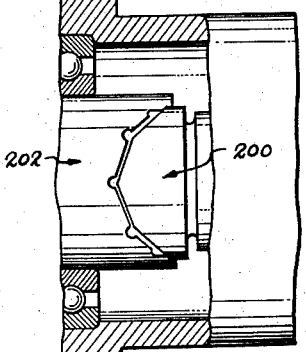
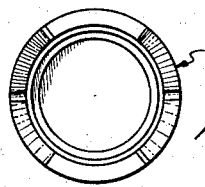
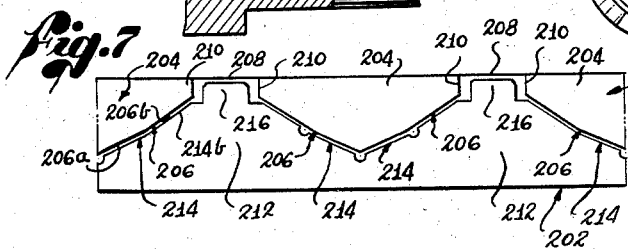
INVENTOR.
JULIUS J. DAVIS
BY
Attorney

United States Patent Office 2,925,157
Patented Feb. 16, 1960

2,925,157

ANTI-REVERSING ROTARY COUPLING

Julius J. Davis, Lynwood, Calif., assignor to Western Gear Corporation, Lynwood, Calif., a corporation of California Application August 12, 1957, Serial No. 677,436

16 Claims. (Cl. 192—8)

This invention relates to a rotary coupling for connecting a rotary driven element to a rotary driving element, and more particularly to an anti-reversing rotary drive coupling for automatically braking the driven element against rotation during inoperative periods of the driving element.

Anti-reversing, rotary couplings or brakes are known in the art. Broadly speaking, these anti-reversing couplings are connected between a rotary driving element and a rotary driven element and are operative to restrain the latter against rotation under the action of a load connected to the rotary driven element except when the latter is being driven by the driving element.

Numerous applications exist for anti-reversing couplings of this character. By way of illustration, one such application is concerned with the movement of aircraft control surfaces, such as flaps. Often, these control surfaces are operated by motors or by hand through jack screw drives. In the interest of reduced friction, the jack screws are commonly of the so-called ball-nut type.

Ball-nut type jack screws possess the undesirable feature that the screw and its driver can be driven in a reverse direction by flight loads on the control surfaces. This undesirable action is commonly avoided by connecting the jack screw to its driving motor or crank through an anti-reversing coupling. As indicated above, this coupling is operative to lock the driven element, which is the jack screw in the example under discussion, against rotation, except when the screw is being driven by its motor or crank.

Various anti-reversing brakes of this character have been devised. In many applications, and especially aircraft applications, the brake mechanism embodied in the anti-reversing brakes are of the multiple disc-type because of the relatively light weight and compact construction of such brake mechanisms.

The illustrative embodiment of the present invention embodies such a multiple disc-type brake mechanism. This brake mechanism comprises, in the conventional manner, a series of interleaved, relatively stationary and relatively movable friction discs which are capable of axial movement into and out of frictional contact with one another. Spring pressure normally urges these discs into frictional contact. The driven shaft of the coupling, which is slidably keyed to the relatively movable friction discs, is thereby normally braked against rotation.

The present coupling embodies cooperating a cam means on the driven shaft and the driving shaft for relieving the spring pressure on the friction discs in response to initial rotation of the driving shaft relative to the driven shaft. The latter shaft is, thereby released for free rotation. Continued relative rotation of the driving and driven shafts results in engagement of driving shoulders on the cooperating cam means for drivably connecting the two shafts. Immediately upon termination of rotation of the driving shaft, the brake releasing force exerted on the brake mechanism by the cooperating cam means is removed. Spring pressure is then reapplied to the friction discs to brake the driven shaft against rotation.

Anti-reversing coupling of this character are subject to certain types of maloperation, if not properly designed. Assume a condition, for example, wherein the driven shaft of the coupling is connected to a jack screw which, in turn, operates an aircraft control surface. Assume further that the load on the control surface is substantially less than that for which the cooperating cam means and brake applying spring pressure of the anti-reversing coupling are designed. Now, as the driving shaft starts to turn, the spring pressure on the friction discs is gradually relieved and the torque transmitted to the driven shaft gradually increased. The driven shaft, however, remains stationary until the torque transmitted thereto is sufficient to overcome the combined restraining torque exerted thereon by the load and the brake.

Under the light operating load conditions set forth above, it will be clear that the torque transmitted to the driven shaft will overcome the restraining torque on the latter shaft, and hence the driven shaft will commence to rotate, prior to complete release of the brake. The coupling, therefore, operates with the brake only partially released.

Assume now another condition wherein the driven shaft of the coupling is connected to a jack screw which, in turn, is coupled to a strongly compressed coil spring. The spring exerts a torque on the driven shaft of the coupling which is prevented from rotating by the now-engaged brake. If, now, the driving shaft is turned in a direction to decrease the tension in the spring, the first action occurring is that of initiating release of the brake.

In this case, of course, the direction of rotation of the driving shaft is the same as the direction of the torque exerted on the driven shaft by the compressed spring. Accordingly, upon release of the brake to a point where the braking force exerted on the driven shaft is overcome by the torque applied to the latter shaft by the coil spring, the driven shaft is rotated by the spring in the direction of turning of the driving shaft. The brake-releasing, cooperating cam means are thereby, in effect, relatively moved in a direction to reapply the brake.

As the driving shaft continues to turn, the brake is again partially released, the driven shaft rotated under the action of the compressed coil spring and the brake reapplied. This intermittent action continues until the tension in the coil spring is no longer sufficient to overcome the torque in the coupling, and results in a high frequency chatter or vibration. Loads other than spring loads also tend to produce this vibratory effect, but at a lower frequency than that resulting from a compressed spring load.

These undesirable effects are eliminated in the present anti-reversing coupling by the provision of novel cooperating, brake releasing cam means. These cam means are so designed as to reduce brake drag at relatively light loads and avoid the aforementioned vibratory effects which are prone to occur during operation of the coupling in a direction to reduce a restraining load on the driven shaft.

With the foregoing preliminary discussion in mind, a broad object of the invention may be stated as being the provision of a new and improved anti-reversing rotary coupling of the character described.

A more specific object of the invention is the provision of an anti-reversing, rotary coupling of the character described which avoids the above-noted and other deficiencies of couplings of this character.

Another object of the invention is the provision of an anti-reversing, rotary coupling of the character described which is capable of proper and reliable operation over relatively wide range of load values.

Yet another object of the invention is the provision of an anti-reversing, rotary coupling of the character described which is relatively immune to undesirable vibrational effects.

A further object of the invention is the provision of an anti-reversing, rotary coupling of the character described which is extremely reliable in operation, capable of transmitting relatively large torques, relatively simple in construction and inexpensive to manufacture, and otherwise especially well suited to its intended functions.

Briefly, the foregoing and other objects are achieved in the illustrative embodiments of the invention by the provision of a stationary, generally cylindrical housing. The driving and driven shafts of the coupling extend concentrically into opposite ends of this housing.

Disposed in one end of the housing is a friction brake comprising a series of interleaved, relatively movable and relatively stationary friction discs which encircle the inner end of the driven shaft. These discs are capable of axial movement, relative to both the housing and driven shaft, into frictional contact. A spring is provided for normally biasing these discs to a condition of frictional contact.

The relatively stationary friction discs are keyed against rotation relative to the housing, while the relatively movable discs are keyed to the driven shaft.

Mounted on the inner, opposing ends of the driving and driven shafts are cooperating cam means. These cam means are responsive to initial rotation of the driving shaft relative to the driven shaft to relieve the spring pressure on the friction discs and thereby release the driven shaft for relatively free rotation. Upon turning of the driving shaft relative to the driven shaft to the point of complete brake release, driving shoulders on the cooperating cam means engage to directly connect the shafts for rotation of the driven shaft by the driving shaft.

These cooperating cam means, which may be generally described as comprising helical cam means, are provided with cam surfaces of two different helix angles. During initial rotation of the driving shaft relative to the driven shaft, the cam surfaces possessing the lower helix angle move over one another to initiate release of the brake. After predetermined rotation of the driving shaft relative to the driven shaft, the cam surfaces possessing the higher helix angle engage to complete release of the brake. Thereafter, driving shoulders on the cams engage to directly connect the driving and driven shafts.

As will become clear as the description proceeds, this novel cam construction is effective to reduce brake drag at relatively light loads, and to eliminate the chatter which is prone to occur under certain conditions of operation. In one illustrative form of the invention, three cooperating cam elements are used, two of which are affixed to the opposing ends of the driving and driven shafts, respectively, and the third of which comprises a floating cam element located between the first two cam elements. In this form of the invention, the cam surfaces of different helix angles are formed at opposite sides of the floating cam. In an alternative form of the invention, only two cam elements, fixed to the ends of the driving and driven shafts, respectively, are employed. In this form of the invention, the cam surfaces on the two cams are provided with portions of two different helix angles.

A better understanding of the invention may be had from the following detailed description thereof, taken in connection with the accompanying drawings, wherein:

Figure 1 is a section taken longitudinally through the present coupling with its brake engaged;

Figures 2 and 3 are detail views of the brake releasing cam means embodied in the coupling of Figure 1, illustrating the same in two different positions of operation;

Figure 4 illustrates the cam means of Figures 2 and 3, laid out in flat pattern;

Figure 5 is a section taken substantially along line 5—5 of Figure 1;

Figure 6 illustrates an alternative form of brake-releasing cam means which may be embodied in the present coupling; and Figure 7 illustrates the cam means of Figure 6, laid out in flat pattern.

Referring now to Figures 1–5, illustrating the form of the present coupling which embodies a floating cam element, the numeral 10 denotes the stationary housing of the coupling. This housing will be seen to be of hollow, generally cylindrical configuration. Extending concentrically into opposite ends of this housing are a driving shaft 12 and a driven shaft 14. Driving shaft 12 is rotatably supported in the left-hand end of the housing, as the coupling is viewed in Figure 1, by ballbearing assemblies 16. Similarly, the driven shaft 14 is rotatably supported in the right-hand end of the housing by a ballbearing assembly 18.

Generally indicated at 20 is a friction brake encircling an inner, reduced end portion 22 of the driven shaft 14. The free end of the driven shaft is still further reduced at 24, and supported in the inner race of a ballbearing 26 mounted in an axial recess 28 in the driven shaft.

As will become clear as the description proceeds, the brake 20 is effective to frictionally restrain the driven shaft 14 against rotation, except when the latter shaft is driven by the driving shaft 12. Release of the brake 20 in response to rotation of the driving shaft 12, as well as subsequent driving connection of the driving shaft to the driven shaft, are effected by the action of cooperating cam means, generally indicated at 30.

Brake 20 comprises a series of interleaved, relatively stationary friction discs 32 and relatively movable friction discs 34. The relatively stationary friction discs 32 are formed about their outer peripheries with a series of radial lugs 36. These lugs 36 slideably engage a series of axial extending grooves 38 in the inner wall of the coupling housing 10. The stationary friction discs 32, therefore, are axially slideable in, but keyed against rotation relative to the housing 10.

The relatively movable friction discs 34 are formed on their inner peripheries with a series of radially inwardly projecting lugs 40. These lugs 40 are slideably engaged in a series of axial grooves 42 in the outer surface of a sleeve 44. Sleeve 44 extends through the several friction discs 32 and 34, as shown, and is slideable on the reduced inner end portion 22 of the driven shaft 14. The sleeve 44 is keyed to the driven shaft 14 by means of keys 46 slideably engaging in axial grooves 48 in the driven shaft.

The right-hand end of the sleeve 44, as the coupling is viewed in Figure 1, abuts an annular pressure plate 50. Pressure plate 50 is slideable on the end 22 of the driven shaft and is keyed to the latter by keys 52 engaging in the shaft grooves 48. The outer periphery of this pressure plate is spaced from the inner wall of the housing 10 so that the plate is capable of longitudinal movement in the housing.

Abutting the right-hand side of this plate and a collar 54 on the driven shaft 14 are a series of coil compression springs 56. These compression springs urge the pressure plate 50 toward the left, as viewed in the drawings, and against the extreme right-hand friction disc 32. In order to facilitate assembly of the collar 54 on the driven shaft 14, the collar may have a central bore slideably fitting over the driven shaft 14, as shown, and be slideably keyed to the shaft by keys 58 engaging in the shaft grooves 48.

The extreme right-hand end of the collar 54 abuts a thrust washer or collar 59. This thrust collar 59 abuts the inner race of the bearing assembly 18 which, in turn, abuts an annular shoulder 60 on the driven shaft 14.

Encircling and spaced from the sleeve 44 at the extreme left-hand end of the series of friction discs 32 and 34, and abutting the left-hand disc 32, is a thrust collar 62. This thrust collar is provided about its outer periphery with a series of radial lugs 64 slideably engaging in the housing slots 38. The thrust collar is provided about its outer periphery with a series of radial lugs 64 slideably engaging in the housing slots 38. The thrust collar 62 is held against left-hand movement by removable segments 66 locked to the thrust collar 62 and engaging in a circumferential groove in the inner wall of the housing 10.

From the description of the coupling thus far, it will be seen that if the pressure plate 50 is unrestrained against left-hand movement under the action of the springs 56, the several friction discs 32 and 34 are resiliently clamped between the pressure plate 50 and the thrust collar 62. Since the discs 32 are keyed against rotation relative to the housing 10 and the discs 34 are keyed against rotation relative to the shaft 14, the frictional contact between the discs, as a result of the axial pressure applied thereto by the springs 56, restrains the driven shaft 14 against rotation in either direction. It will further be clear, however, that if the pressure plate 50 is moved to the right, as the coupling is viewed in Figure 1, against the action of the springs 56 so as to relieve the pressure on the friction discs 32 and 34, the relatively movable discs 34 will be capable of relatively free rotation relative to the stationary discs 32. The driven shaft 14, therefore, under these conditions, will be released for rotation.

Right-hand movement of the pressure plate 50 to release the brake 20, as above described, is accomplished by the action of the cam means 30 in response to rotation of the driving shaft 12. As will be now described, the camming action produced by the cam means 30 moves the sleeve 44, which abuts the pressure plate 50, toward the right. Pressure plate 50 is, thereby, also moved to the right against the action of the springs 56 to release the brake 20.

Cam means 30 comprises a series of three cam elements 68, 70 and 72. Cam 68 comprises a driven cam which is integrally formed on the left-hand end of the brake releasing sleeve 44 and the cam 72 comprises a driving cam which is integrally formed on the right-hand end of the driving shaft 12. The intermediate cam element 70 which also forms a driving cam comprises a floating cam which engages, at opposite sides, cam elements 68 and 72.

Cams 68 through 72 are generally conical in shape and circular in cross-section and for clarity of illustration and description are illustrated as laid out flat in Figure 4.

Referring to Figure 4, cam 68 will be seen to comprise two diametrically opposed lobes 74. These lobes are circumferentially spaced, as indicated at 76. The end walls 78 of the lobes, which define opposite side walls of the spaces 76 between the lobes, extend in axial planes of the driven shaft and define driving shoulders, as will presently become more fully appreciated.

The axially facing edge surfaces 80 of the lobes, which form the cam surfaces of the cam 68, are straight and inclined with respect to one another, as shown. These cam surfaces 80 will be seen to extend from the ends of the drive shoulders 78 to the approximate center lines of the respective lobes 74.

The cam surfaces 80 are inclined to a reference plane R in Figure 4, perpendicular to the cam axis, by an angle of approximately 40 degrees. When the cam 68 of Figure 4 is rolled into circular form, it will be clear that the cam surfaces 80 become helical cam surfaces having approximately a 40 degree helix angle.

The floating cam 70, as viewed in its unwrapped condition of Figure 4, will be seen to comprise, in a manner similar to the cam 68, a pair of diametrically opposed lobes 82. The tips of these lobes define driving lugs 84 engageable in spaces 76 between the lobes 74 of the cam 68. The edge walls 85, at opposite sides of these lugs 84, extend in planes longitudinally of the cams and define driving shoulders engageable with the driving shoulders 78 of the cam 68.

The inclined side walls 86 of the lobes 82 form axially facing cam surfaces engageable with the cam surfaces 80 on the cam 68. These cam surfaces 86 are inclined at the same angle to the reference plane R, as the cam surfaces 80.

The opposite end of the floating cam 70, which is the left-hand end of the cam, as the coupling is viewed in Figure 1, is of somewhat reduced diameter as compared to the diameters of the cams 68 and the cam at the right-hand end of the floating cam 70. This left-hand end of the floating cam 70, therefore, appears somewhat smaller in its flat condition in Figure 4.

As shown in this latter figure, the left-hand end of the floating cam 70 is generally similar to the cam 68 in that it comprises a pair of diametrically opposed lobes 88 circumferentially separated by spaces 90. The walls 92 at opposite sides of these spaces define driving shoulders.

The lobes 88 are generally similar to the lobes 74 of the cam 68 and differ from the latter lobes only in their lesser circumferential extent, owing to the above-mentioned difference in diameters of the cams, and the lesser inclination of the axially facing cam surfaces 94 on the lobes 88 relative to the inclination of the cam surfaces 80 on the lobes of the cam 68. When the cams 68 and 70 are rolled to their circular shape, therefore, the cam surfaces 94 at the left-hand end of the floating cam 70 have a lesser helix angle, approximately 20 degrees, than the helix angle of the cam surfaces 80 on the cam 68.

The cam 72, on the inner end of the driving shaft 12, is generally identical to the cam at the right-hand end of the floating cam 70, in that it comprises a pair of diametrically opposed lobes 96 which engage between the lobes 88 at the left-hand end of the floating cam. These lobes 96 are formed with axially facing cam surfaces 98 inclined at the same angle as the cam surfaces 94 on the floating cam. Also, the tips of the lobes 96 are formed with lugs 100 engageable in the recesses 90 of the floating cam and formed with drive shoulders 102 engageable with the drive shoulders 92 on the floating cam.

It is clear, therefore, that the three cams 68, 70 and 72, when rolled to circular shape, appear in side elevation as illustrated in Figure 1. Referring now again to this latter figure, the floating cam 70 is formed with an axial bore 104, slideably receiving the left-hand end of the reduced portion 22 of the driven shaft 14. The floating cam 70 is, therefore, capable of right-hand movement on the driven shaft 14, in a manner described below, to move the right-hand cam 68, and the sleeve 44 integral therewith toward the right and against the pressure plate 50 to release the brake 20.

The operation of the above coupling will now be described. In the normal inoperative condition of the coupling, that is, the condition wherein the driving shaft 12 is stationary, and the brake 20 is engaged to restrain the driven shaft 14 against rotation, the parts of the coupling are positioned as shown in Figure 1. It will be seen that in this inoperative condition of the coupling, the lobes on each of the cams 68, 70 and 72 are nested in the generally V-shaped spaces between the lobes on the adjacent cam. Also, the cam surfaces on the adjacent lobes abut. In Figure 1, the cams are shown as slightly spaced for the sake of clarity. The right-hand end of the sleeve 44, integral with the cam 68, is now slightly spaced from the pressure plate 50, as shown, so that the entire force of the springs 56 is applied to the series of friction discs 32 and 34. As previously described, the frictional contact between the relatively movable and relatively stationary discs, as a result of this spring pressure, frictionally locks the driven shaft 14 against rotation.

Upon rotation of the driving shaft 12 in either direction, the left-hand cam 72 is first rotated relative to the floating cam 70 (see Figure 2). This is so, owing to the greater helix angle of the abutting cam surfaces 80 and 86 on the cam 68 and the cam at the right-hand end of the floating cam 70 which tend to retain the latter against rotation with the cam 72 at this time. As the cam 72 rotates relative to the cam 70, the cam surfaces 98 on the cam 72 ride over the cam surfaces 94 on the floating cam 70. This causes right-hand axial movement of the floating cam 70, the cam 68 and the sleeve 44 integral with the latter cam. The right-hand end of the sleeve 44 is thereby immediately moved into contact with the pressure plate 50 and the latter is moved toward the right against the action of the springs 56. The brake 20, therefore, commences to release.

Eventually, relative rotation of the cam 72 with respect to the floating cam 70 will bring the driving lugs 100 on the cam 72 into engagement with the driving shoulders 92 at the left-hand end of the floating cam. The floating cam 70 is, thereby, drivably connected to and thus rotates with the cam 72.

The right-hand cam 68, however, tends to remain stationary by virtue of the braking action of the still partially engaged brake 20. Rotation of the floating cam 70 with the drive shaft 12, therefore, results in movement of the cam surfaces 86 at the right-hand end of the floating cam along the cam surfaces 80 on the cam 68 (see Figure 3). This imparts additional right-hand movement to the cam 68 and the sleeve 44 integral therewith to effect further release of the brake 20. Eventually, the driving lugs 84 at the right-hand end of the floating cam 70 are rotated into engagement with the driving shoulder 78 on the cam 68. The brake 20 is now completely released and a direct driving connection exists from the driving shaft 12, through the interengaging driving lugs and driving shoulders on the cams 68 to 72, to the driven shaft 14. The driven shaft is, therefore, directly rotated from the driving shaft. The above action, of course, is the same regardless of the direction in which the driving shaft 12 is rotated.

Upon termination of rotation of the driving shaft 12, the axial pressure exerted on the sleeve 44 by the springs 56, results in a camming action between the several engaging cam surfaces of the cams 68 to 72, tending to rotate the latter back to their normal position of Figure 1. Brake 20 is, therefore, reapplied to again frictionally lock the driven shaft 14 against rotation. The above-described cycle of operation is repeated in response to each rotation and subsequent termination of rotation of the driving shaft 12.

The configuration of the brake releasing cams described above gives rise to two highly beneficial results. First, less brake drag occurs under light loads. Thus, as preliminarily mentioned, if the coupling is not properly designed, in those cases where the load is substantially less than that for which the cams and brake spring are designed, only partial release of the brake is prone to occur and the coupling operates with the brake dragging. As mentioned, this is due to the fact that with a relatively light load on the driven shaft, the torque applied to the shaft by the driving shaft becomes sufficient to rotate the driven shaft before substantially complete release of the brake has been effected.

With the present cam configuration, however, wherein cam surfaces of two different helix angles are provided, rotation of the driving shaft results first in relative movement of the cam surfaces possessing the lesser helix angle because of the lesser resistance to relative rotation of these cam surfaces due to their lesser helix angle. Further, it will be obvious that the smaller the helix angle of the cams, the smaller will be the torque transmitted to the driven shaft during this initial rotation of the driving shaft. Accordingly, while the driving shaft must turn through a proportionately greater angle to effect a given amount of brake release by the action of the cam surfaces of lesser helix angle, a given amount of brake release may be accomplished with a reduced transmitted torque to the driven shaft. Clearly, therefore, with a given, minimum load on the driven shaft, the latter is less prone to turn with the driving shaft, during initial rotation of the latter to effect initial release of the brake. Increased brake releasing action, with relatively light load on the driven shaft, is, therefore, accomplished by the cam surfaces of lesser helix angle.

Eventually, relative rotation of the floating cam 70 and the left-hand cam 72 brings the driving lugs 100 on the cam 72 into engagement with the driving shoulders 92 on the floating cam. As previously mentioned, the floating cam is now drivably connected to the driving shaft. Continued rotation of the driving shaft, therefore, results in turning of the floating cam 70 relative to the right-hand cam 68. The cam surfaces 74 and 86 on the latter cams, therefore, rotate relative to one another to accomplish a continued brake releasing action. The torque transmitted to the driven shaft during this relative rotation of the latter cam surfaces, of course, is increased and, for a relatively light load on the driven shaft, may become sufficient to overcome the restraining torque on the driven shaft prior to engagement of the driving lugs 84 and driving shoulder 78 on the cams 68 and 70. In such a case, the driven shaft will rotate with the driving shaft. By this time, however, even with a relatively light load on the driven shaft, substantial release of the brake 20 will have been accomplished as previously mentioned. The brake, therefore, will drag only slightly. If the load on the driven shaft is sufficient, of course, the cams 68 and 70 will rotate relative to one another until the driving shoulders 78 and driving lugs 84 engage to directly connect the driven shaft to the driving shaft. Brake 20 is then completely released.

A second beneficial result achieved by the cam surfaces of two different helix angles is that of avoiding undesirable vibrational effects or chatter. Thus, assuming the driven shaft to be connected to a strongly compressed spring, rotation of the driving shaft in a direction to decrease the tension of the spring will result in release of the brake 20, and rotation of the driven shaft under the action of the compressed spring in the manner preliminarily discussed. During this rotation of the driven shaft by the spring, the cams 68 through 72 will be relatively rotated from a condition wherein the cam surfaces of larger helix angle on the cams 68 and 70 engage to a condition wherein the cam surfaces of lesser helix angle on the cams 70 and 72 engage. The transition from engagement of the cam surfaces of greater helix angle to engagement of the cam surfaces of lesser helix angle interrupts the normal frequency of vibration of the parts and introduces certain static friction forces which produce a damping action. This damping action inhibits the previously discussed vibration effects which are prone to occur under these conditions.

Figures 6 and 7 illustrate a modified brake releasing cam arrangement which may be embodied in the present coupling. As shown in these latter figures, only two cams 200 and 202 are employed. Cam 200, the driven cam, is fixed to the end of the driven shaft, while cam 202, the driving cam, is fixed to the end of the driving shaft.

Cams 200 and 202 are similar in configuration to cams 68 and 70 in that cam 200 has a pair of diametrically opposed lobes 204 having helical axially facing cam surfaces 206 and a pair of diametrically opposed recesses 208, between the lobes, defining driving shoulders 210. The cam 202 is similar to the cam 70 in that the former has a pair of diametrically opposed lobes 212 formed with axially facing helical cam surfaces 214 and a pair of diametrically opposed driving lugs 216 at the high points of the lobes. These driving lugs are engageable in the recesses 208 of the cam 200, as in the previous form of the coupling.

In the modified cam arrangement of Figures 6 and 7, however, each of the cam surfaces 206 and 214 comprise cam surface sections of two different helix angles. Thus, cam surface 206 comprises, as shown most clearly in Figure 7 illustrating the cams in flat condition, a cam surface section 206A of reduced helix angle, and a cam surface section 206B of somewhat larger helix angle. Similarly, cam surface 214 comprises a cam surface section 214A of relatively small helix angle and a cam surface section 214B of larger helix angle.

The action of the modified cams 200 and 202 of Figures 6 and 7 is similar to the camming action described with reference to Figures 1–5. Thus, during initial rotation of the driving shaft, the cam surface sections 206A and 214A of the lesser helix angle rotate relative to one another to accomplish a given amount of brake release with a reduced transmitted torque to the driven shaft. Upon relative movement of these cam surface sections to their full extent, the cam surface sections 206B and 214B of increased helix angle engage and move relative to one another to effect an increased brake releasing action. Finally, the driving lugs 216 on the cam 202 engage one or the other of the driving shoulders 210 on the cam 200, depending on the direction in which the driving shaft turns, to directly connect the driven shaft to the driving shaft.

It will be clear, therefore, that the cam configuration of Figures 6 and 7 accomplishes the same beneficial results as described with reference to Figures 1–5.

From the foregoing description, it will be clear that there has been described and illustrated an anti-reversing, rotary coupling which is fully capable of attaining the objects and advantages preliminarily set forth. While certain preferred embodiments of the invention have been described and illustrated, they are purely illustrative in nature, it being apparent that numerous modifications in design and arrangement of parts are possible within the scope of the following claims.

I claim:

1. An anti-reversing, rotary drive coupling, comprising a housing, coaxial rotary driving and driven members in said housing, a first circular cam coaxial with said members and drivably connected to said driving member, a second circular cam coaxially mounted on said driven member for rotation with and axial movement along the latter member, engageable, axially facing cam faces integrally formed on the cams for axially moving said second cam away from said first cam when the latter cam is turned from a given angular position relative to said second cam, normally engaged releasable brake means acting between said housing and driven member for restraining the latter against rotation in the housing, said brake means including means engageable by said second cam upon movement of the latter away from the first cam for releasing said brake means, and said cams including integral, axially extending driving shoulders which engage upon predetermined relative turning of said first cam from said given angular position with respect to the second cam to form a positive driving connection between the cams.

2. The subject matter of claim 1 wherein said cams comprise circumferentially spaced, axially extending, interengaging lobes of axially tapered configuration, said lobes being integrally formed on said cams and having inclined edge surfaces forming said inclined cam faces.

3. The subject matter of claim 2 wherein the driving shoulders on one cam are located at the apex ends of the lobes on the latter cam, and the driving shoulders on the other cam are located at the base of the lobes on the latter cam.

4. The subject matter of claim 1 wherein each of said cams comprise a pair of circumferentially spaced, axially extending lobes of axially tapered configuration, the lobes on one cam engaging between the lobes on the other cam, and said lobes having engageable inclined edge surfaces forming said inclined cam faces, the lobes on one cam having at their bases circumferentially spaced, opposing wall surfaces disposed in axial planes of the latter cam and forming said driving shoulders on the latter cam, and the lobes on the other cam having at their apex ends rectangular driving lugs which extend between said opposing wall surfaces, said lugs affording said driving shoulders on the latter cam.

5. The subject matter of claim 1 wherein said driving and driven members comprise rotary shafts, and said first cam is rigid on said driving shaft.

6. The subject matter of claim 1 wherein said inclined cam faces comprise generally helical cam faces including a pair of engageable cam face portions having different helix angles.

7. The subject matter of claim 1 wherein said cams comprise circumferentially spaced, interengaging lobes of axially tapered configuration, said lobes having generally helical edge surfaces forming said inclined cam faces whereby the latter are generally helical cam faces, said cam faces including pairs of engageable cam face portions adjacent the apex ends and bases of the lobes, respectively, the engageable cam face portions adjacent the apex ends of the lobes having a smaller helix angle than the engageable cam face portions adjacent the base of the lobes and being disposed for engagement prior to engagement of the latter cam face portions.

8. An anti-reversing rotary drive coupling comprising a housing, rotary driving and driven members journalled on said housing, a first circular cam coaxial with said driven member and drivably connected to said driving member, a second circular cam coaxially mounted on said driven member for rotation with and axial movement along the latter member, a third circular floating cam coaxial with and located between said first and second cams, first engageable, inclined cam faces on said first and third cams for axially moving said second and third cams in a direction away from said first cam when the latter cam is turned relative to said third cam, second engageable, inclined cam faces on said second and third cams for axially moving said second cam in said direction when said third cam is turned relative to said second cam, said second cam being axially movable toward said first cam to a first axial position when the latter cam occupies a first angular position relative to the third cam and the latter cam occupies a second angular position relative to the second cam, said second cam being moved in said direction from said first axial position to a second axial position upon turning of said first cam to a third angular position relative to said third cam and being moved in said direction from said second axial position to a third axial position upon subsequent simultaneous turning of said first and third cams relative to the second cam to a fourth angular position of said third cam relative to said second cam, normally engaged, releasable brake means acting between said housing and driven member for restraining the latter against rotation, said brake means including means engageable by said second cam upon movement of the latter from said first axial position toward said third axial position for releasing said brake means, and driving shoulders on said cams which engage upon relative turning of said first cam to said third angular position and relative turning of said third cam to said fourth angular position to form a positive driving connection between said cams.

9. The subject matter of claim 8 wherein said cam faces comprise generally helical cam faces, the engageable cam faces on said first and third cams having a smaller helix angle than the engageable cam faces on said second and third cams.

10. The subject matter of claim 8 wherein said cams comprise circumferentially spaced, interengaging lobes of tapered configuration having inclined edge surfaces forming said inclined cam faces.

11. An anti-reversing rotary drive coupling comprising a housing, rotary driving and driven members in the housing, the driving member being rotatable between a given normal position and a drive position with respect to the driven member, a cam coupling connected between said members including an element which turns with one member, an element which turns with the other member, and circumferentially inclined, axially engageable cam face means between the elements which slide over one another to cam one element in one axial direction with respect to the other element when said elements are relatively turned by rotation of the driving member from said normal position to said drive position, a spring operated friction brake to restrain the driven member against turning in the housing including a pressure plate which is spring loaded to apply the brake and retractable against the action of its spring to release the brake, means acting between said axially movable element and pressure plate to retract the latter upon movement of said latter element in said one axial direction, said cam face means including first cam faces which initially engage and slide over one another to effect initial retraction of the pressure plate during rotation of the driving member from said normal position to an intermediate position between said normal and drive positions and second cam faces which subsequently engage and slide over one another to effect final retraction of the pressure plate during rotation of the driving member from said intermediate position to said drive position, said first cam faces being inclined at a smaller angle than said second cam faces so as to produce less retractile movement of the pressure plate for a given angle of rotation of the driving member with respect to the driven member than said second cam faces, and means which drivably connect said members when the driving member is turned to said drive position.

12. An anti-reversing rotary drive coupling comprising a housing, coaxial rotary driving and driven members in the housing, the driving member being rotatable between a given normal position and a drive position with respect to the driven member, a cam coupling between said members including a plurality of coaxial circular cam elements, one of which turns with the driving member and another of which turns with the driven member, and axially engageable circumferentially inclined cam face means on said cam elements which slide over another to cam one element in one axial direction when said elements are relatively turned by rotation of the driving member from said normal position to said drive position, a spring operated friction brake to restrain the driven member against turning in the housing including a pressure plate which is spring loaded to apply the brake and is retractable against the action of its spring to release the brake, means acting between said axially movable element and pressure plate to retract the latter upon movement of said latter element in said one axial direction, said cam face means including first cam faces which initially engage and slide over one another to effect initial retraction of the plate during rotation of the driving member from said normal position to an intermediate position between said normal and drive positions and second cam faces which subsequently engage and slide over one another to effect final retraction of the pressure plate during rotation of the driving member from said intermediate position to said drive position, said first cam faces being inclined at a smaller angle than said second cam faces so as to produce less retractile movement of the pressure plate for a given angle of rotation of the driving member with respect to the driven member than said second cam faces, and means which drivably connect the members when the driving member is turned to said drive position.

13. The subject matter of claim 12 wherein said cam elements have interengaging, axially extending lobes, the edge surfaces of which form said cam faces.

14. The subject matter of claim 11 wherein said means to drivably connect the members comprise axially extending drive shoulders which are integrally formed on the cam elements and engage upon rotation of the driving member to said drive position.

15. An anti-reversing rotary drive coupling comprising a housing, coaxial rotary driving and driven members in the housing, a first cam element connected to the driving member for rotation with the latter, a second cam element connected to the driven member for rotation with the axial movement along the latter member, first axially engageable circumferentially inclined cam faces on said elements which slide over one another to impart initial axial movement in one direction to the second element during rotation of the driving member through a given angle from an initial normal position with respect to the driven member, second axially engageable circumferentially inclined cam faces on said elements which engage and slide over another to impart final axial movement in said one direction to said second element during continued rotation of the driving member beyond said given angle, said second cam faces being inclined at a greater angle than said first cam faces so as to impart greater axial movement to said second element for a given angle of rotation of the driving member with respect to the driven member than said first cam faces, means to drivably connect said members upon predetermined rotation of said driving member with respect to the driven member, a spring operated friction brake to restrain the driven member against turning in the housing including a spring loaded pressure plate to apply the brake, and a connection between said second element and plate for retraction of the latter to release the brake by said axial movement of said second element in said one direction.

16. An anti-reversing rotary drive coupling comprising a housing, coaxial rotary driving and driven members in the housing, a first cam element connected to the driving member for rotation with the latter, a second cam element connected to the driven member for rotation with and axial movement along the latter member, a third axially floating cam element between said first and second elements, first axially engageable circumferentially inclined cam faces on said first and third elements which slide over one another to impart axial movement to the second and third elements during rotation of the driving member through a given angle from an initial normal position with respect to the driven member, means to drivably connect said first and third elements upon turning of the driving shaft through said given angle with respect to the driven shaft, second axially engageable circumferentially inclined cam faces on said second and third elements which engage and slide over another to impart continued axial movement to said second element during continued rotation of the driving member beyond said given angle, means to drivably connect said members upon turning of said driving member through a predetermined angle with respect to the driven member after engagement of said second cam faces, said second cam faces being inclined at a greater angle than said first cam faces, a spring operated friction brake to restrain the driven member against turning in the housing including a spring loaded pressure plate to apply the brake, and a connection between said second element and pressure plate for retraction of the latter to release the brake, by said axial movement of said second element.

References Cited in the file of this patent

UNITED STATES PATENTS

| | | |
|---|---|---|
| 1,808,008 | Schmithals | June 2, 1931 |
| 1,900,852 | Kuppersmith | Mar. 7, 1933 |
| 2,211,788 | Lucht | Aug. 20, 1940 |
| 2,391,172 | Leland | Dec. 18, 1945 |
| 2,480,212 | Baines | Aug. 30, 1949 |
| 2,659,466 | Ochtman | Nov. 17, 1953 |
| 2,783,861 | Jungles | Mar. 5, 1957 |
| 2,834,443 | Olchawa | May 13, 1958 |